Feb. 2, 1965 T. BRENIG 3,168,706
MULTI-STAGE TRANSISTOR AMPLIFIER WITH
OPERATING POINT STABILIZATION
Filed Oct. 3, 1960 2 Sheets-Sheet 1

Jnventor:
Theodor Brenig
by: Michael S. Striker
Attorney

Feb. 2, 1965 T. BRENIG 3,168,706

MULTI-STAGE TRANSISTOR AMPLIFIER WITH OPERATING POINT STABILIZATION

Filed Oct. 3, 1960 2 Sheets-Sheet 2

Inventor:
Theodor Brenig
by Michael S. Striker
Attorney

United States Patent Office 3,168,706
Patented Feb. 2, 1965

3,168,706
MULTI-STAGE TRANSISTOR AMPLIFIER WITH OPERATING POINT STABILIZATION

Theodor Brenig, Bern, Switzerland, assignor to Hasler A.G., Werke für Telephonie und Präzisionsmechanik, Bern, Switzerland Filed Oct. 3, 1960, Ser. No. 59,896
Claims priority, application Switzerland, Oct. 2, 1959, 78,924
3 Claims. (Cl. 330—18)

The present invention refers to multi-stage transistor amplifiers.

The invention is particularly concerned with the problem of automatically stabilizing the performance of a multi-stage transistor amplifier in such a manner that it operates stably even in the case of minimum loads and in presence of temperature variations.

As is known transistors are very sensitive to temperature variations. This makes it necessary to provide for means which are intended to have the effect that the operative performance of such transistor circuits changes as little as possible when the ambient temperature changes or when individual transistors of the circuit are exchanged.

In stabilizing the performance of the transistor it is of particular importance to stabilize the location of the operating point of the transistor. This means that the ratio between $\Delta J_c$ and $J_c$ must be as small as possible, wherein $J_c$ represents the normal collector current and $\Delta J_c$ represents the variation thereof for instance due to a temperature change. Actually the value $\Delta J_c$ depends mainly upon variations of the residual collector current. From the fact, however, that the magnitude of the residual collector current is practically independent of the location of the operating point, it follows that a particularly high degree of stabilization is necessary for those circuits which operate with a small collector current $J_c$.

It is therefore a main object of this invention to provide for a circuit of a multi-stage transistor amplifier which has an extremely high degree of automatic stabilization.

It is another object of this invention to provide for a circuit of the type set forth which comprises comparatively few additional components and is entirely reliable in operation.

With above objects in view the invention provides in a transistor amplifier arrangement having at least three stages each including one transistor, means for applying a corrective bias voltage derived from any one of said stage transistors to the respectively corresponding second following stage transistor, whereby the operating point of each of said second following stage transistors is automatically stabilized when the operating point of the respectively second preceding stage transistor is stabilized.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawing, in which:

Figure 1:
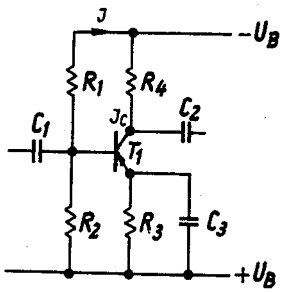
Fig. 1 PRIOR ART
FIGS. 1 and 2 are explanatory circuit diagrams of known transistor amplifier arrangements having one and two stages, respectively.

The known circuit arrangement of a one-stage transistor amplifier illustrated by FIG. 1 comprises one transistor $T_1$ whose current supply is carried out from a source of electric energy $U_B$ via the resistors $R_1$, $R_2$, $R_3$ and $R_4$. Fixed condensers $C_1$ and $C_2$ are provided in the amplifier input and the output, respectively. A further condenser $C_3$ is connected in parallel with the emitter resistor $R_3$ in order to carry off the alternating current component. For properly dimensioning the components usually first the collector current $J_c$ and the emitter resistance $R_3$ are chosen and the voltage divider ratio $R_2/R_1+R_2$ is calculated accordingly.

In order to attain a good stabilization of the transistor $T_1$, the emitter resistor $R_3$ must have a high ohmic resistance. However, it is desirable to have as low as possible a resistance in the base resistor arrangement which can be calculated according to the well known formula $R_1R_2/R_1+R_2$.

Unfortunately, the resistance values of the resistors $R_1$ and $R_2$ cannot be reduced beyond certain limits because the current consumption J of this voltage divider arrangement should usually be smaller than that represented by the collector current $J_c$ of the transistor $T_1$.

Figure 2:
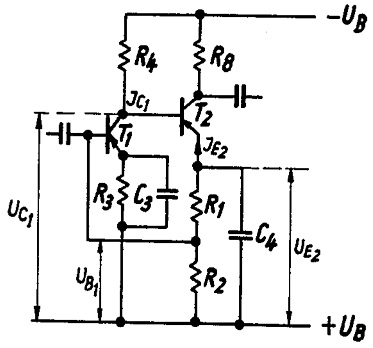
Fig. 2 PRIOR ART

The above mentioned disadvantage can be eliminated by the improved circuit of a known two-stage transistor amplifier arrangement according to FIG. 2. The amplifier circuit of FIG. 1 is here supplemented by a second transistor amplifier stage including the transistor $T_2$ which is supplied by the first transistor stage. The circuit arrangement is such that the collector of the transistor $T_1$ is directly connected with the base of the transistor $T_2$, while the voltage supply to the base of the transistor $T_1$ contains not only the above-mentioned voltage divider resistors $R_1$ and $R_2$ but also the emitter-collector circuit of the transistor $T_2$.

In this case again the base resistance of the transistor $T_1$ is determined according to the fraction $R_1R_2/R_1+R_2$. However, it can be seen from the diagram that this voltage divider arrangement is passed by the emitter current $J_{e_2}$ and that this voltage divider does not draw additional current from the battery. Therefore this voltage divider can be composed of resistors of very low ohmic resistance whereby a good stability of the transistor $T_1$ is obtained. The current consumption of the arrangement is extremely small because the battery has only to furnish the two transistor currents.

The circuit of FIG. 2 contains additionally a reverse coupling which, as will be shown, effects a further improvement of the stability.

For the purpose of explanation it may be assumed that the current $J_{c_1}$ increases, e.g. on account of an exchange of the transistor $T_1$ or due to an increase in temperature. This would cause a drop of the voltages $U_{C_1}$, $U_{E_2}$, and $U_{B_1}$ which are respectively the potentials at the collector of the transistor $T_1$, at the emitter of the transistor $T_2$ and the potential at the base of the transistor $T_1$. This voltage drop, in turn, causes a decrease of the collector current $J_{c_1}$ and consequently reduces the initial change of this current. Thus, the provision of the reverse coupling effects the stabilization of the transistor $T_1$.

Also the transistor $T_2$ is very well stabilized in this circuit arrangement. As has been explained the potential $U_{c1}$ varies very little. The main requirement, however, for obtaining the stabilization of this transistor $T_2$ is that the voltage change between the base and ground is as small as possible. It is even possible that upon temperature increase of the entire amplifier arrangement the ordinarily appearing current increase of the particular transistor is overcompensated by the change of the base current.

In the circuit of FIG. 2, the emitters of the two stages are blocked off by condensers $C_3$ and $C_4$, respectively, so that no alternating current reverse coupling can take place. However, if desired, such coupling could be introduced in a generally known manner.

Figure 3:
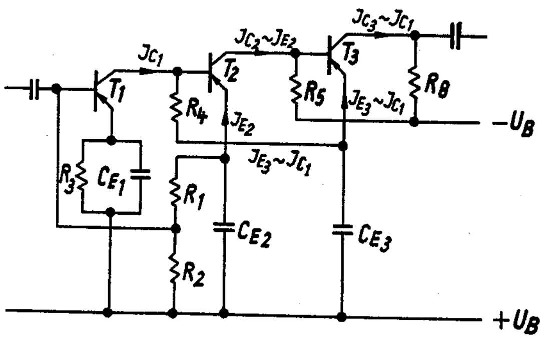
FIG. 3 is a schematic circuit diagram illustrating a three-stage transistor amplifier arrangement according to the invention.

FIG. 3 illustrates by way of example a three-stage amplifier arrangement according to the invention. The collectors of the transistors $T_1$, $T_2$ are respectively connected with the next following stage transistors $T_2$ and $T_3$, respectively, directly.

From a junction point between the collector of the transistor $T_1$ and the base of the transistor $T_2$ connection including a resistor $R_4$ is taken to the emitter of the transistor $T_3$.

The emitter current $J_{E3}$ of the transistor $T_3$ which is to be stabilized, flows across the resistor $R_4$ practically in its full strength from the collector of the transistor $T_1$. Only a negligibly small portion of this current flows from the base of the transistor $T_2$. If the collector current of the transistor $T_1$ is well stabilized, then the transistor $T_1$ may be considered as a source for current supply having a high internal impedance. Consequently the current of the transistor $T_3$ is likewise well stabilized.

To explain this in a simpler way, it may be considered that the transistors $T_3$ and $T_1$ carry practically an equal amount of current. If the current across the transistor $T_1$ has been stabilized by suitable means then also the current across the transistor $T_3$ is stabilized. A direct current reverse coupling takes place between the transistors $T_3$ and $T_2$ across the resistor $R_4$. Hereby a further improvement of the stability is attained. As far as alternating current conditions are concerned, the stages are decoupled from each other by the condensers $C_{E1}$, $C_{E2}$ and $C_{E3}$, respectively However if it is desired, an alternating current reverse coupling could be provided in well known manner.

It is worth noting that the current consumption of this arrangement consists only of the sum of $J_{c1}$ and $J_{E2}$, which is naturally very low.

The basic type of the arrangement according to the invention can be expanded to as many transistor stages as desired.

Figure 4:
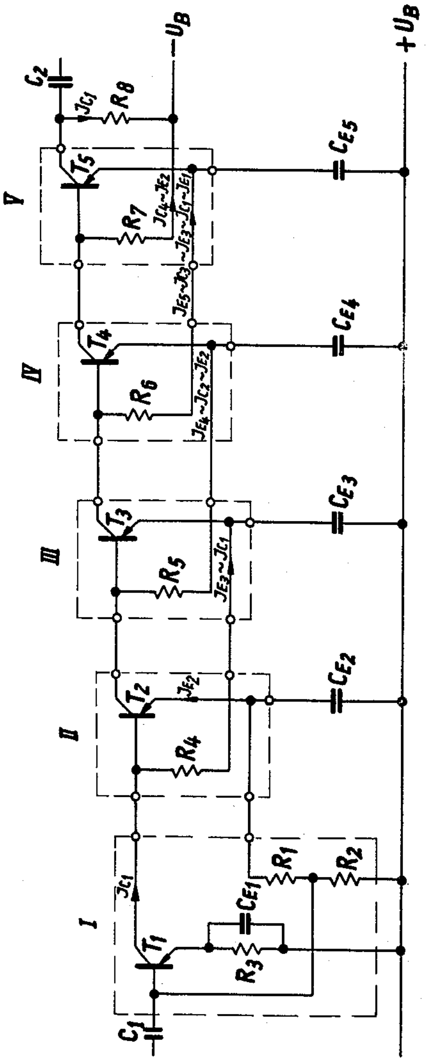
FIG. 4 is a schematic circuit diagram of a five-stage transistor amplifier arrangement according to the invention.

FIG. 4 illustrates as a further example a five-stage transistor amplifier arrangement. The individual stages are indicated by the rectangles shown in dotted lines and marked I, II . . . V. The collector current from transistor $T_1$ flows through transistor $T_3$ and the transistor $T_5$, the collector current from transistor $T_2$ flows through the transistor $T_4$. If the currents through transistors $T_1$ and $T_2$ are well stabilized then also the currents through the transistors $T_3$, $T_4$ and $T_5$ are stabilized.

A direct current reverse coupling takes place between the transistors $T_3$ and $T_2$ across the resistor $R_4$, a direct current reverse coupling between the transistors $T_4$ and $T_3$ takes place across the resistor $R_5$, and a further direct current reverse coupling takes place between the transistors $T_5$ and $T_4$ cross the resistor $R_6$. Hereby a further improvement of the stabilization is achieved. As far as alternating current conditions are concerned the individual stages are decoupled by the condensers $C_{E1}$ . . . $C_{E5}$.

The substantial advantages of this circuit arrangement are characterized by the extremely small current consumption and by the very small amount of components required for obtaining the desired results. The transistors of the stages having an odd order number are practically passed by the current $J_{c1}$, while the transistors of the stages having an even order number are passed by the current $J_{c2}$. This is due to the fact that the amounts or values $J_{E5}$, $J_{c3}$, $J_{E3}$, $J_{c1}$ and $J_{E1}$ are approximately equal with each other, and likewise the values $J_{E4}$, $J_{c2}$ and $J_{E2}$ are approximately equal to each other. The entire current consumption of the whole arrangement consequently amounts to the sum of the currents $J_{c1}$ and $J_{E2}$.

It will be understood that each of the elements described above or two or more together, may also find a useful application in other types of transistor amplifier arrangements differing from the types described above.

While the invention has been illustrated and described as embodied in a transistor amplifier arrangement having at least three stages each including one transistor, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. In a transistor amplifier arrangement having an input and an output and at least three stages each including one transistor, in combination, means for coupling the input with the base of the transistor of the first stage; means for coupling the output with the collector of the transistor of the final stage; a source of direct current supply having a first and second terminal; means for directly coupling the collector of the transistor of each stage to the base of the transistor of the next following stage, respectively; means for connecting the emitter of the transistor of said first stage to said first terminal of said source; a resistive voltage divider network including two resistors connected in series between the emitter of the transistor of said second stage and said first terminal of said source, the junction point between said two resistors being connected with the base of said transistor of said first stage; a plurality of resistance means respectively coupling directly the collector of the transistor of the individual stages to the emitter of the transistor of the respectively second following stage; a first resistor connected between said second terminal of said source and the collector of said transistor of said final stage; a second resistor connected between said second terminal of said source and the base of said transistor of said final stage.

2. A transistor amplifier arrangement according to claim 1 including at least one capacitor means connected between the emitter of at least one stage and said first terminal of said source.

3. In a transistor amplifier arrangement having an input and an output and at least three stages each including one transistor, in combination, means for coupling the input with the base of the transistor of the first stage; means for coupling the output with the collector of the transistor of the final stage; a source of direct current supply having a first and a second terminal; means for directly coupling the collector of the transistor of each stage to the base of the transistor of the next following stage, respectively; a resistive voltage divider network including two resistors connected in series between the emitter of the transistor of said second stage and said first terminal of said source, the junction point between said two resistors being connected with the base of said transistor of said first stage; a first resistor connected between said second terminal of said source and the collector of said transistor of said final stage; a second resistor connected between said second terminal of said source and the base of said transistor of said final stage; resistive means connected between the emitter of the transistor of said first stage and said first terminal of said source; a plurality of capacitor means connected between the emitters of all stages, respectively, and said first terminal of said source; and a plurality of resistance means respectively coupling directly the collector of the transistor of the individual stages to the emitter of the transistor of the respectively second following stage.

References Cited by the Examiner

UNITED STATES PATENTS

| | | | |
|---|---|---|---|
| 2,794,076 | 5/57 | Shea | 330—18 XR |
| 2,822,434 | 2/58 | Ehret | 330—19 |
| 2,926,307 | 2/60 | Ehret | 330—18 |
| 2,943,267 | 6/60 | Randise | 330—18 |

ROY LAKE, *Primary Examiner.*

BENNETT G. MILLER, JOHN KOMINSKI, *Examiners.*